United States Patent
Permeh et al.

(10) Patent No.: US 11,182,471 B2
(45) Date of Patent: *Nov. 23, 2021

(54) ISOLATING DATA FOR ANALYSIS TO AVOID MALICIOUS ATTACKS

(71) Applicant: Cylance Inc., Irvine, CA (US)

(72) Inventors: Ryan Permeh, Irvine, CA (US); Derek A. Soeder, Irvine, CA (US); Matthew Wolff, Newport Beach, CA (US); Ming Jin, Irvine, CA (US); Xuan Zhao, Irvine, CA (US)

(73) Assignee: Cylance Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,610

(22) Filed: Feb. 1, 2018

(65) Prior Publication Data

US 2018/0157826 A1 Jun. 7, 2018

Related U.S. Application Data

(63) Continuation of application No. 15/252,106, filed on Aug. 30, 2016, now Pat. No. 9,928,363.

(Continued)

(51) Int. Cl.
*G06F 21/51* (2013.01)
*G06F 21/53* (2013.01)
(Continued)

(52) U.S. Cl.
CPC ............ *G06F 21/51* (2013.01); *G06F 21/53* (2013.01); *G06F 21/56* (2013.01); *G06F 21/562* (2013.01);
(Continued)

(58) Field of Classification Search
CPC ............ G06F 21/121; G06F 2221/033; G06F 21/50–568; H04L 63/14–1491; H04L 63/02–029; G06N 20/00–20
See application file for complete search history.

(56) References Cited

U.S. PATENT DOCUMENTS 6,772,346 B1 * 8/2004 Chess ................... H04L 63/145
709/223
7,607,171 B1 10/2009 Marsden et al.
(Continued)

FOREIGN PATENT DOCUMENTS

WO 2017147072 A1 8/2017

OTHER PUBLICATIONS

Pektaş, Abdurrahman, and Tankut Acarnnan. "A dynamic malware analyzer against virtual machine aware malicious software." Security and Communication Networks 7.12 (2014): 2245-2257. (Year: 2014).*

(Continued)

Primary Examiner — Madhuri R Herzog
(74) Attorney, Agent, or Firm — Jones Day

(57) ABSTRACT

Determining, by a machine learning model in an isolated operating environment, whether a file is safe for processing by a primary operating environment. The file is provided, when the determining indicates the file is safe for processing, to the primary operating environment for processing by the primary operating environment. When the determining indicates the file is unsafe for processing, the file is prevented from being processed by the primary operating environment. The isolated operating environment can be maintained on an isolated computing system remote from a primary computing system maintaining the primary operating system. The isolating computing system and the primary operating system can communicate over a cloud network.

18 Claims, 6 Drawing Sheets

Related U.S. Application Data

(60) Provisional application No. 62/300,624, filed on Feb. 26, 2016.

(51) Int. Cl.
  *H04L 29/06* (2006.01)
  *G06F 21/56* (2013.01)
  *G06N 20/00* (2019.01)

(52) U.S. Cl.
  CPC .......... *G06F 21/566* (2013.01); *G06N 20/00* (2019.01); *H04L 63/1408* (2013.01); *H04L 63/1416* (2013.01); *G06F 2221/033* (2013.01); *H04L 63/0227* (2013.01); *H04L 63/145* (2013.01)

(56) References Cited

U.S. PATENT DOCUMENTS

| | | | |
|---|---|---|---|
| 8,332,946 B1* | 12/2012 | Boisjolie | H04L 63/145 726/24 |
| 8,763,128 B2 | 6/2014 | Lim et al. | |
| 8,782,792 B1 | 7/2014 | Bodke | |
| 8,832,829 B2 | 9/2014 | Manni et al. | |
| 8,997,219 B2* | 3/2015 | Staniford | H04L 63/1416 726/22 |
| 9,015,814 B1* | 4/2015 | Zakorzhevsky | G06F 21/564 726/4 |
| 9,215,239 B1* | 12/2015 | Wang | H04L 63/1408 |
| 9,306,962 B1 | 4/2016 | Pinto et al. | |
| 9,390,266 B1* | 7/2016 | Zakorzhevsky | G06F 21/561 |
| 9,470,157 B2 | 10/2016 | Liu et al. | |
| 9,942,263 B2* | 4/2018 | Kraft | H04L 63/145 |
| 10,095,602 B2 | 10/2018 | Gautam et al. | |
| 2007/0174915 A1* | 7/2007 | Gribble | G06F 21/566 726/24 |
| 2009/0044024 A1 | 2/2009 | Oberheide et al. | |
| 2010/0192222 A1 | 7/2010 | Stokes et al. | |
| 2011/0078794 A1* | 3/2011 | Manni | G06F 21/566 726/23 |
| 2012/0304244 A1 | 11/2012 | Xie et al. | |
| 2013/0291111 A1* | 10/2013 | Zhou | G06F 21/566 726/23 |
| 2013/0305366 A1 | 11/2013 | Lim et al. | |
| 2014/0007239 A1* | 1/2014 | Sharpe | G06F 16/137 726/24 |
| 2014/0090061 A1* | 3/2014 | Avasarala | G06F 21/56 726/24 |
| 2015/0227741 A1* | 8/2015 | Permeh | G06F 21/51 726/22 |
| 2015/0292419 A1 | 10/2015 | Liu et al. | |
| 2016/0124724 A1 | 5/2016 | Gautam et al. | |
| 2016/0292419 A1* | 10/2016 | Langton | G06F 21/567 |
| 2017/0124325 A1* | 5/2017 | Alme | G06F 17/30327 |

OTHER PUBLICATIONS

Lu et al., "Using Multi-Feature and Classifier Ensembles to Improve Malware Detection," Journal of CCIT, 39:2, 57-72 (2010).
Zhang et al., "Malicious Codes Detection Based on Ensemble Learning," Autonomic and Trusted Computing, 468-477 (2007).
Wozniak et al., "A Survey of Multiple Classifier Systems as Hybrid Systems," Information Fusion, 16: 3-17 (2014).
Menahem et al., "Improving Malware Detection by Applying Multi-Inducer Ensemble," Computational Statistics & Data Analysis, 53:4, 1483-1494 (2009).
International Search Report for International Patent Application No. PCT/US2017/018723, dated Mar. 30, 2017 (6 pages).
Non-Final Office Action for U.S. Appl. No. 15/252,106 dated Dec. 23, 2016 (17 pages).
Final Office Action for U.S. Appl. No. 15/252,106 dated Mar. 31, 2017 (25 pages).
Non-Final Office Action for U.S. Appl. No. 15/252,106 dated Aug. 25, 2017 (21 pages).

* cited by examiner

ISOLATING DATA FOR ANALYSIS TO AVOID MALICIOUS ATTACKS

CROSS REFERENCE TO RELATED APPLICATIONS

This application claims priority to U.S. Utility patent application Ser. No. 15/252,106 filed on Aug. 30, 2016 which, in turn, claims priority to U.S. Provisional Patent Application No. 62/300,624 filed Feb. 26, 2016, entitled "ISOLATING DATA FOR ANALYSIS TO AVOID MALICIOUS ATTACKS," the contents of both of which are hereby incorporated by reference in their entirety.

TECHNICAL FIELD

The subject matter described herein relates to selective isolation of files for analysis to determine whether it is safe to execute the files.

BACKGROUND

Conventional techniques of application execution control for programs run on computer systems rely on static methods such as databases of signatures to determine if a computer can safely run a particular program. Existing application control systems require frequent updates to these databases, and require significant overhead to manage this process. Additionally, their ability to control execution efficiently and correctly reduces as their databases grow. Such approaches utilize significant resources (e.g., memory, CPU, etc.) and additionally have a high management overhead.

Conventional techniques also analyze files for security issues using the same processing cores as are used for executing the files.

SUMMARY

In one aspect, methods including one or more operations, systems configured to perform one or more operations, and apparatuses for performing one or more operations, are described for verifying that a file is safe for interaction with a processor. The one or more operations can include determining, by a machine learning model in an isolated operating environment, whether a file is safe for processing by a primary operating environment. When the determining indicates the file is safe for processing, the file can be provided to the primary operating environment for processing by the primary operating environment. When the determining indicates the file is unsafe for processing, the file can be prohibited from being processed by the primary operating environment.

In some variations, the determining can be performed in response to an indication that the file has an unsafe file type. The determining can be performed during loading of an application in the primary operating environment. The application can be loaded in the primary operating environment in response to a user request to open the file. The determining can be performed in response to a user request to interact with the file.

In some variations, the isolated operating environment and the primary operating environment can be hosted by the same machine. In some variations, the isolated operating environment can be hosted by an isolated machine remote from a primary machine which is hosting the primary operating environment.

The file can be transmitted from the primary machine to the isolated machine prior to the determining. The isolated machine can be connected to the primary machine through a cloud-based network.

In some variations, the file can be an executable-type file. The file can be a file-type which, when interacted with, causes the at least one processor to initialize a program to execute the file. In some variations, the file-type of the file is PE, OLE, MachO, PDF, ELF, JAVA, DOCX, a script, or the like.

The operations can include monitoring a network to identify files having an unsafe file type transmitted on the network. The file can be provided to the isolated operating environment in response to identifying a file having an unsafe file type.

In some variations, the file can include an email. The determining can be performed in response to receipt of an email over a network.

The determining can be performed in response to a scan of a database indicating that a file stored in the database has an unsafe file type.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a software system or system architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The presently described subject matter provides solutions to monitor data being processed on a system, such as an enterprise computing system, and flag suspicious data for further processing to determine the legitimacy of the suspicious data. Conventional techniques of application execution control for programs run on computer systems rely on static methods such as databases of signatures to determine if a computer can safely run a particular program. The presently described subject matter provides solutions to avoid the necessity to continually update databases of signatures.

Figure 1:
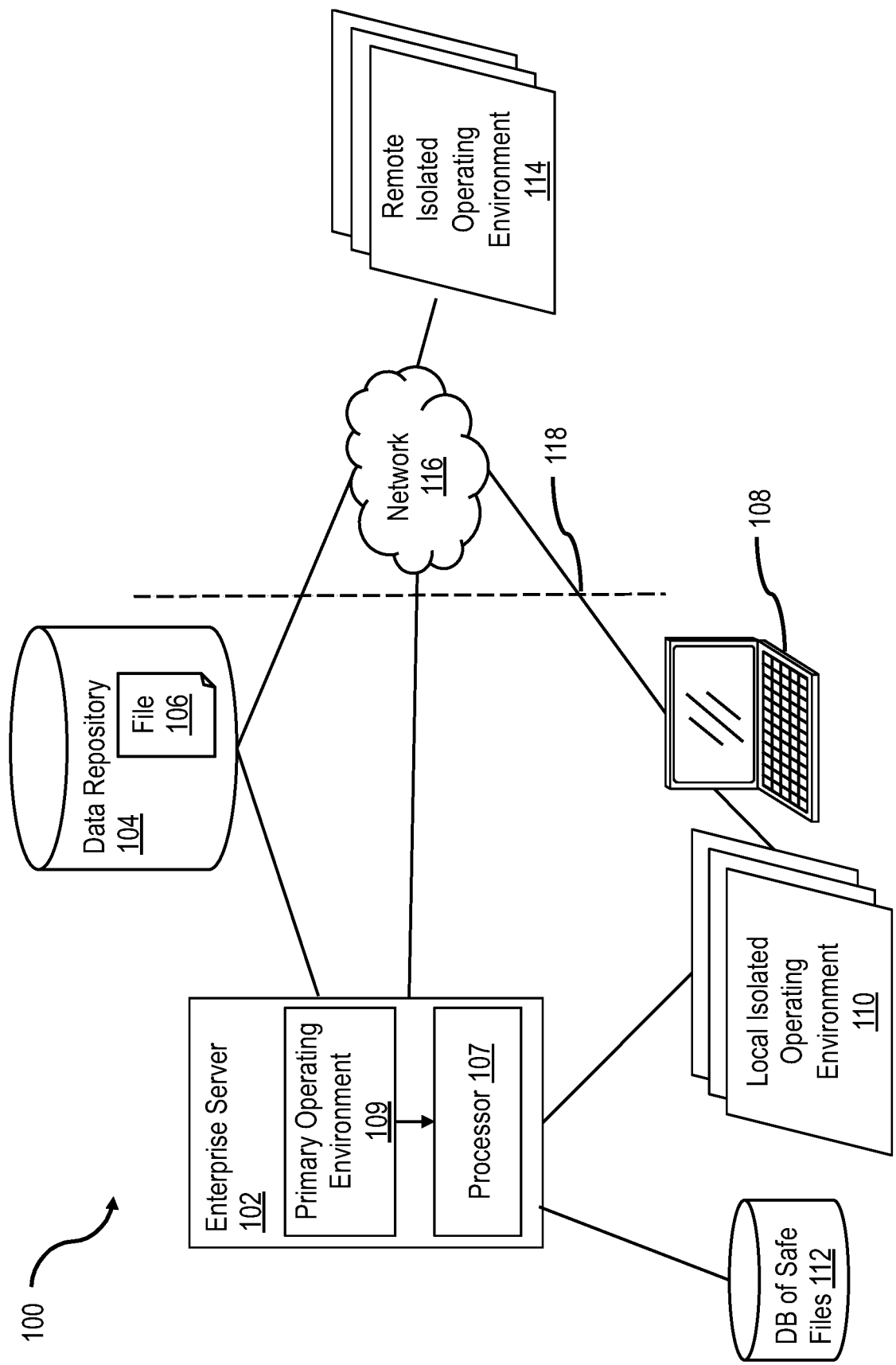
FIG. 1 is an illustration of a system having one or more features consistent with the present description.

FIG. 1 is an illustration of a system 100 having one or more features consistent with the present description. The system 100 is an exemplary illustration of one manner in which a system may be set up. The system 100 can include an enterprise server 102. The enterprise server can include a processor 107 for performing one or more operations 107. The enterprise server 106 can be configured to maintain a primary operating environment 109. The enterprise server 102 can be configured to manage and maintain the enterprise computing systems. For example, an enterprise may maintain a data repository 104 storing one or more data files 106. The system 100 can include a user terminal 108. The user terminal 108 can facilitate interaction, by a user, with the computer systems managed and maintained by the enterprise server 102. The user terminal 108 can be configured to send a request to the enterprise server 102 for access to the data file 106 stored on the data repository 104. The enterprise server 102 can be configured to determine access permissions based on one or more user parameters to data file 106, and, in response to determining that the user can have access to the data file 106 can be configured to facilitate transmission of the data file 106 to the user terminal 108.

Typically, when a data file is requested by a user terminal 108, a software application, or a portion thereof, is executed on the user terminal 108. Executing a software application can include the execution of multiple application files that are stored on the user terminal 108. In some variations, executing the software application can include the execution of one or more application files that are stored on an enterprise server 102. Application files stored on an enterprise server 102 can be transmitted to the user terminal 108 in response to an initiation of the execution of the software application on the user terminal 108.

During initiation of an application, or portion thereof, on the user terminal 108, there is typically a load screen associated with the application presented to the user on a display device of the user terminal 108 for a period of time. During this time one or more files are requested. The one or more files can be an executable-type file, data file, a script, or the like. The one or more files can be a file-type which, when interacted with, causes the at least one computer processor to initialize a program to execute the file. The file-type of the file can be PE, OLE, MachO, PDF, ELF, JAVA, DOCX a script, or the like. The file types described herein are exemplary of the kinds of file types that can cause the at least one compute processor to initialize a program.

The requested file, whether the requested file is a data file, application file, or the like, can be analyzed in an isolated operating environment, for example by a local isolated operating environment 110, or a remote isolated operating environment 114.

An isolated operating environment can be an operating environment configured to execute one or more files without those files affecting the primary operating environment 109. If the one or more files have malicious programming, the effects of the malicious programming can be limited to the isolated operating environment, thereby avoiding the malicious programming from affecting the primary operating environment 109 and potentially causing business interruptions and the like. The isolated operating environment may be implemented in a variety of ways including a separate directory, a virtual machine, and/or the like.

In some variations, the isolated operating environment can be configured to analyze the data file in response a determination that the requested file does not match with a database of files 112 that are known to be safe. In some variations, the enterprise server 102 can be configured to compare the data file 106 against the database of safe files 112. In some variations, the isolated operating environment can be configured to compare the data file 106 against the database of safe files 112.

In some variations, the local isolated operating environment 110 can be hosted by the enterprise server 102 or a computing system in communication with the enterprise server 102. The remote isolated operating environment 114 can be hosted by a remote server. The remote server can be in communication with the enterprise server 102 through a network 116. The network 116 can be the Internet. The remote server can be a cloud server. The remote isolated operating environment 114 can be a cloud-based isolated operating environment 114.

The isolated operating environment can analyze, using a machine learning model, the data file 106. Through the analysis, by the machine learning model, the isolated operating environment can determine whether a file, such as file 106, is safe for processing by the primary operating environment 109.

When the determining indicates that the file 106 is safe for processing, the isolated operating environment can provide the file 106 to the primary operating environment 109 for processing. When the determining indicates that the file 106 is unsafe for processing, the isolated operating environment can prevent the file 106 from being processed by the primary operating environment 109. The unsafe file can be quarantined, deleted, or the like. A notification of the unsafe file can be provided to an administrator. The notification can include a nature of the problem with the file as determined by the machine learning model.

While the user terminal 108, enterprise server 102, and isolated operating environments are illustrated as separate components, in some variations, the user terminal 108, the enterprise server 102, or the like, can perform one or more functions of the isolated operating environment. For example, the user terminal 108 can include the primary operating environment 109, or part thereof. For example, the user terminal 108 can include a database of files, similar to, or the same as database 112, that are known to be safe for interaction by the user terminal 108 and/or primary operating environment 109 and can be configured to compare the requested file against that database. In some variations, the database included in the user terminal 108 can be a subset or a portion of the database 112. The portion of the database 112 included on the user terminal 108 can include files most likely to be interacted with by the user terminal 108.

In some variations, network traffic can be monitored. The network traffic that is monitored can be traffic that is transmitted along dedicated connections between components of the enterprise systems. The network traffic that is monitored can be traffic that is transmitted from outside dedicated enterprise systems, or accessed by enterprise system components, for example, data transmitted over the Internet 116 that interacts with enterprise system components. The monitoring of network traffic can include monitoring network traffic for network data packets that do not conform to a known safe network data packet form. As used herein, components within an enterprise system can include components on an enterprise side of a firewall 118. In some variations, the firewall 118 can separate the components of the enterprise system from a Wide Area Network, such as the Internet.

In some variations, the isolated operating environment, such as isolated operating environment 110, isolated operating environment 114, or the like, can be configured to analyze documents, or files, received over one or more application protocols. For example, the isolated operating environment can be configured to analyze emails, and/or email attachments, received over an email application protocol. The isolated operating environment can be configured to analyze emails and/or email attachments as they are received by a component of the enterprise system. The isolated operating environment can be configured to analyze emails and/or email attachments in response to a user opening the email and/or email attachment. In some variations, the isolated operating environment, such as isolated operating environment 110, isolated operating environment 114, or the like, can be configured to analyze files, documents, and/or other types of data that are stored or resident on a storage device. These files, documents, and/or other types of data may not be used in execution (for example, in a storage state rather than being executed).

The requested file can be isolated in response to the requested file not being matched with the database of files 112. In some variations, the requested file stored on one or more components of the enterprise system can be locked from further interaction while being analyzed by the isolated operating environment. A copy of the requested file can be transmitted to the isolated operating environment. In some variations, the isolating can be by an isolated operating environment logically separate from the enterprise server 102 or user terminal 108, but physically co-located with the enterprise server or user terminal. In some variations, isolating the requested file can include transmitting the file to a remote isolated operating environment 114 isolated from one or more enterprise computing systems and/or components. The isolated operating environment 114 can be logically separate and physically separate from the enterprise server 102 or user terminal 108. A firewall 118, or other data security system, can be disposed between remote isolated operating environment 114 and the enterprise server 102 and/or user terminal 108. The data security system can be configured to facilitate prevention of malicious code and/or data that may be contained in the requested file from entering business critical components of an enterprise system, such as the enterprise server 102, electronic storage 104, user terminal 108, and/or the like.

The isolated operating environment, such as local isolated operating environment 110 or remote isolated operating environment 114, can be configured to use a machine learning model to determine whether the file is safe for interaction one or more components of an enterprise system 100. The one or more components of an enterprise system 100 can include an enterprise server 102, an enterprise database 104, a user terminal 108, or the like. The one or more components of the enterprise system 100 can comprise at least one processor 107.

The isolated operating environment can be configured to deny interaction with the requested file by the one or more components of the enterprise system 100. For example, the requested file may be denied processing by the primary operating environment 109. The primary operating environment 109 can be executed on the server 102, a user terminal 108, or the like. Denial of the interaction can occur in response to a determination, by the isolated operating environment, that the file is not safe for interaction by one or more components of the enterprise system. In some variations, where the file was previously locked for interaction by components of the enterprise system, the file can be removed from the component(s) of the enterprise system. The isolated operating environment, can be configured to transmit a notification to one or more of the enterprise server 102, user terminal 108, an administrator, or the like. The notification can include an indication of the denial of the interaction, by one or more components of the enterprise system, with the requested file. The notification can include an indication of the nature of the denial and/or data type of the unsafe file.

The isolated operating environment, such as local isolated operating environment 110, remote isolated operating environment 114, or the like, can be configured to allow interaction with the requested file by the one or more components of the enterprise system. Allowance of the interaction can occur in response to a determination, by the isolated operating environment, that the file is safe for interaction by one or more components of the enterprise system. The isolated operating environment, such as the local isolated operating environment 110, remote isolated operating environment 114, or the like, can transmit the file to the enterprise server 102, the database 104, the user terminal 108, or the like, in response to allowance of interaction with the file by the isolated operating environment. The requested file can be transmitted to the enterprise system component that is to initiate execution of the requested file. In some variations, one or more parameters of the file can be provided to the component of the enterprise system. The one or more parameters can include an indication of the identity and/or location of the file on systems local to the enterprise system component. In this manner, the file need not be transmitted back to the component(s) of enterprise system if it is deemed to be safe. This can increase the efficiency of the analysis of the files.

When the isolated operating environment is integrated with the user terminal 108, the isolated operating environment can release the requested file for interaction by a processor of the user terminal 108, in response to identifying that the requested file is safe by machine learning models.

In some variations, the isolated operating environment, such as local isolated operating environment 110, remote isolated operating environment 114, or the like, can be configured to scan the electronic memory storage device 104. The electronic memory storage device 104 can be associated with the enterprise server 102. The scanning of the electronic memory storage device 104 can include scanning to identify data stored on the electronic memory storage device that do not match with a database of known safe data-types.

In response to data being identified as data that does not match with a database of known safe data-types, the data can be isolated the enterprise system.

The isolated operating environment, such as local isolated operating environment 110, remote isolated operating environment 114, or the like, can be configured to analyze the isolated data to determine whether the identified data is safe for interaction by the at least one computer processor. The analysis can be performed using a machine learning model.

The isolated operating environment can be configured to cause removal of the identified data from the memory storage device 104, in response to determining that the identified data is unsafe for interaction by one or more components of the enterprise system, such as enterprise server 102, user terminal 108, electronic storage device 104, or the like.

In response to determining that the data is safe for interaction by one or more components of the enterprise system, the isolated operating environment can cause an updating of the database of known safe data to include the identified data. In some variations, the isolated operating environment can cause the data identified as being safe data on the electronic storage device 104 to be updated to include a flag indicating that the data is safe for interaction.

Figure 2:
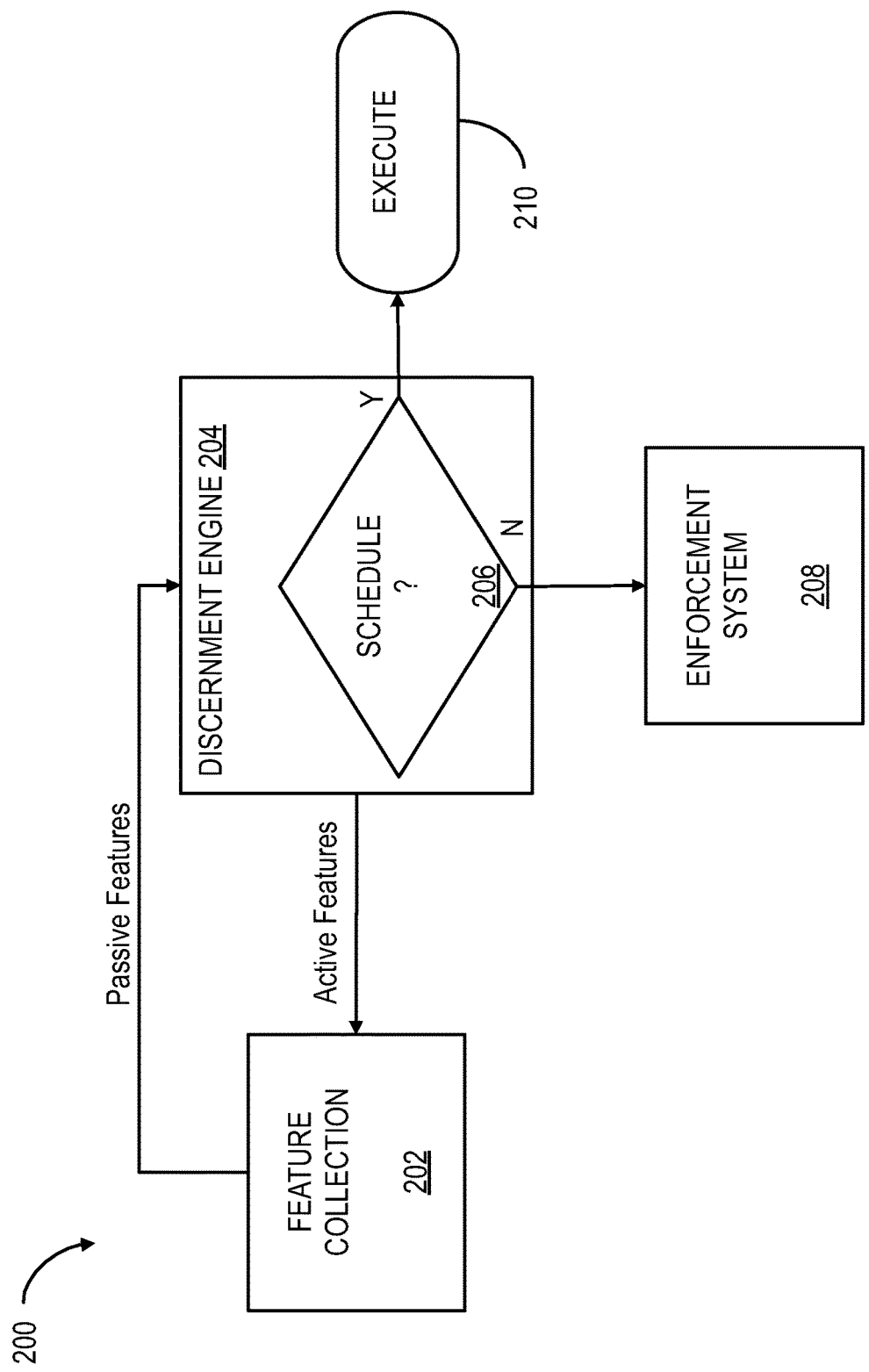
FIG. 2 is a system diagram illustrating elements used to provide data interaction control discernment, having one or more features consistent with the present description.

FIG. 2 is an illustration of a system 200 for discerning whether data is safe for interaction by one or more components of an enterprise system, the system 200 having one or more features consistent with the current subject matter. The one or more components of the enterprise system can include an enterprise server 102, electronic storage device 104, user terminal 108, or the like. Discernment can refer to the characterization of whether or not to allow a particular data parcel, file, or the like, to be interacted with by at least one processor of a component of an enterprise system. The data parcel, file, or the like, can include a data file, executable file, an application, a portion of an application, an operating system, a portion of an operating system, or the like.

The elements of the system 100 can include a feature collection system 202 (sometimes referred to as a feature collector), a discernment engine 204, and an enforcement system 206. The feature collection system 202 can be configured to collect or otherwise access features characterizing an application, program and/or the environment in which data, a file, or the like, is being executed or to be executed. The feature collection system 202 can be configured to pass the features to the discernment engine 204. The discernment engine 204 can be configured to make a decision, at 206, on whether or not the data, file, or portion thereof, is safe for interaction with one or more components of the enterprise system. If it is determined, by the discernment engine 204, that the file should not be interacted with by at least one processor of a component of the enterprise system, then the enforcement system 208 can take action to prevent the file from being interacted with.

A "feature" as used herein can include any salient data/data point that can be used to measure the implied safety of a potentially run program. "Data" as used herein is a piece of executable computer code that a user or system wishes to execute, and may include associated data and/or metadata. "Discernment" as used herein is the process of deciding whether the data should be interacted with or not (including whether or not to continue executing a program or application that is using, or will use, the data). "Enforcement" as used herein is a process in which the effects of discernment are made effective in a computer system, such as an enterprise system, or the like. The presently described subject matter can utilize one or more machine learning models that are each a mathematically based understanding of a particular situation and one or more algorithms defined to determine an outcome from a particular input against the model. In some variations, an ensemble of machine learning models can be used which is a collection of models utilized in a particular way to generally improve accuracy or reduce variance.

The presently described subject matter can include systems configured to forego both a "blacklist" approach and a "whitelist" approach to data security as the primary selection method for determining whether to permit interaction with data. The presently described system can, instead, measure various features from the system and can use these against a previously trained machine learning model and/or ensemble of machine learning models.

The ensemble of machine learning models can be devised and trained before application control. Due to the predictive nature of various machine-learning algorithms, a trained model can allow a "fuzzy" match against safe and unsafe programs. By carefully selecting and training the models in the ensemble, the system can act resiliently against change over time, accommodating small and large changes in program behaviors that resemble "safety" or a lack thereof. A machine-learning model may be characterized by an algorithm it incorporates, which may include, as an example, neural networks, support vector machines, logistic regressions, scorecard models, Bayesian algorithms, decision trees, and/or the like. A machine learning model can be trained using supervised learning, in which a training set of input samples labeled with the desired output values conditions the model to correctly classify samples that do not occur in the training set, or it may be trained using unsupervised learning, in which an algorithm identifies hidden structure in unlabeled data. Reinforcement learning represents a third process for training a model.

Referring back again to FIG. 2, the feature collector 202 can be configured to send passive features (operational and dynamic) on an ongoing basis to the discernment engine 204. The discernment engine 204 can be configured to request point-in-time features from the feature collector 202 at a particular decision point, for example, execution. These point-in-time features can include observations about the computer's state extrinsic to the application being processed or related features from an external source. The discernment engine 204 can then decide if the data should be interacted with. If interaction is allowed, the data can be transmitted for interaction by one or more of the enterprise system components; if execution is disallowed, the enforcement system 208 can be configured to prevent the data from being interacted with.

Figure 3:
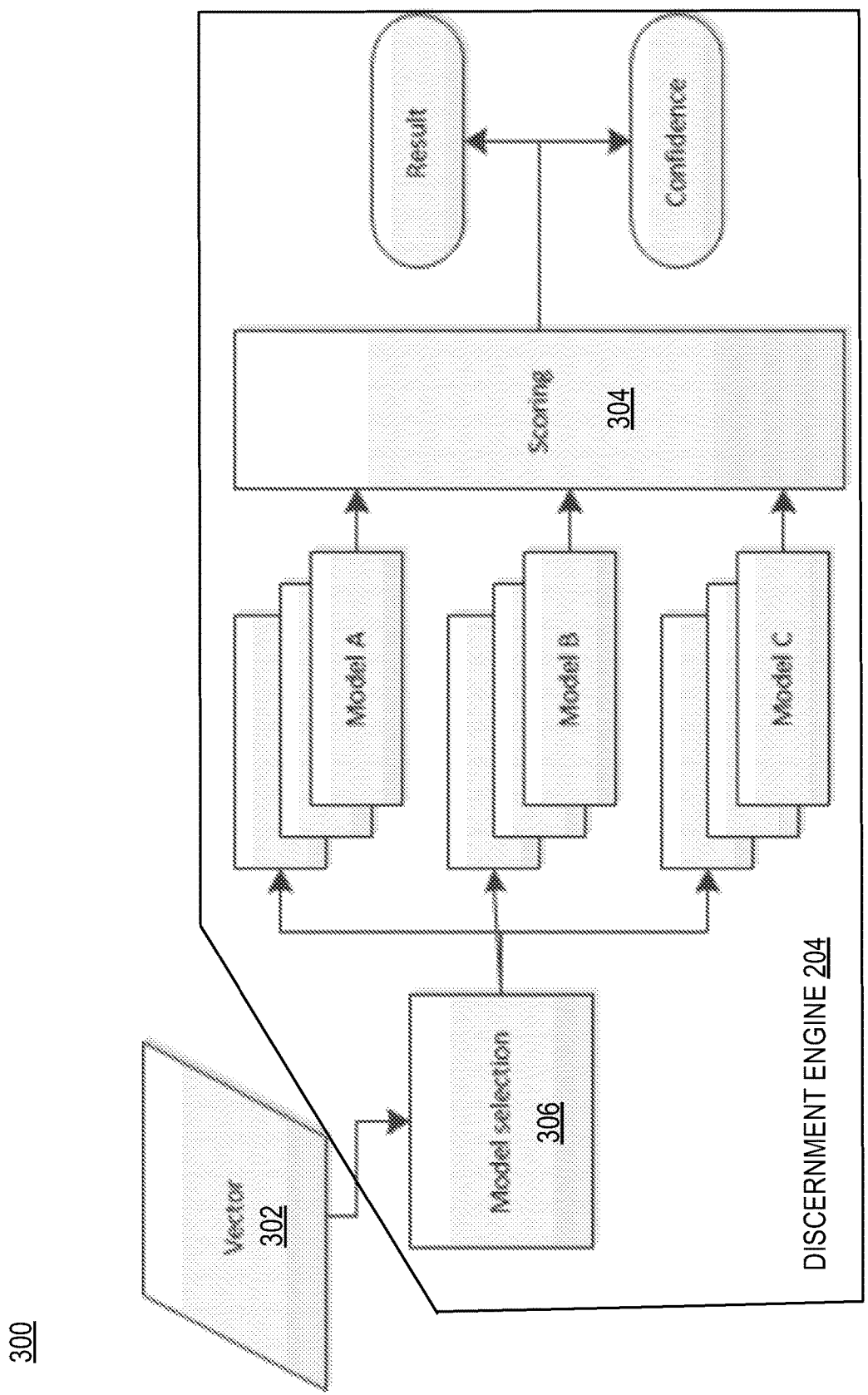
FIG. 3 is a diagram characterizing ensemble discernment, having one or more features consistent with the present description.

FIG. 3 is a diagram 300 characterizing ensemble discernment in which an original vector 302 can be passed to the discernment engine 204 for scoring 304. The discernment engine 204 can use a model selector 306 to choose one or more models to run (in this example, Models A, B, C). The selection of a model can be predicated on features provided by the feature collector 202, a user configuration, the current availability or scarcity of computing resources, and/or other state information. Each such model can be comprised of several possible algorithms. The output of the various algorithms and models can be combined (using, for example, a weighting arrangement or model) in a scoring component

304. A final output can be a decision (or in some cases a score) characterizing the results and a confidence level.

Feature collection can be a combination of point in time and ongoing measurements, and can include the passive collection of features into a general cache. Features can be used to generate data points for which the discernment engine 204 makes a decision. The discernment engine 204 can utilize the features collected to make a decision based on previously collected data. The enforcement system 208 can implement the technical details of operation regarding the decisions made from the discernment engine 204.

If a user or other program wishes to request an interaction with data, a file, or the like, it will first ask the discernment engine 204 to decide if this is a positive action. The discernment engine 204 can either answer with previous discernments, or create a new discernment using a combination of previously collected features and features collected via a point in time analysis. The discernment engine 204 can comprise one or more components. For example, the discernment engine 204 can include an isolated operating environment, such as a local isolated operating environment 110, which can be part of the internal enterprise system, such as enterprise server 102. The discernment engine 204 can comprise, for purposes of quarantining unknown data, an isolated remote isolated operating environment, such as remote isolated operating environment 114. The discernment engine 204 can be configured to cause isolation of data in response to creating a new discernment. The discernment engine 204 can cause isolation of data to a cloud-based isolated operating environment, such as cloud-based isolated operating environment 114.

With the decision made as to the nature of the data, the enforcement system 208 can implement the logic to allow or disallow interaction with the data, and any other elements necessary to implement the discernment decision in an ongoing manner.

Features can be collected from various sources. In one implementation, features can be collected from four primary sources.

A first source can comprise operational features that relate to the operational environment of the system. Operational features can include existing programs, details about the operating system, run status of the program, configuration variables associated with the program, and other measures particular to the environment in which the program is intended to run. Some of these features can be ongoing (i.e., they are active features); others can be determined at a particular point in time (i.e., they are passive features).

A second source can comprise static features that concern the data that has been requested for interaction with by a data processor of at least one component of the enterprise system. Measurements about the data itself, including structural elements and data contents, can be collected. These features can be calculated by examining the contents of the data and processing through analytic methods. One example of a static feature of data is the size of such data. Examples of structural elements of data can include the number of sections it comprises, the proportion of the data described by each section, and the proportion of the data not described by any section. For example, the computed Shannon entropy of each section is an example of a feature derived from processing.

A third source can comprise dynamic features that relate to individual program execution. Dynamic features can generally be collected in an ongoing manner. The dynamic features can be associated with a particular program, rather than the system itself. These features can be used to determine potentially hostile activities from a program that was either unable to receive a high confidence discernment prior to interaction or otherwise authorized to run under direct management policy.

A fourth source can comprise external features that can be generally extracted from sources of information outside of the host computer itself, generally via a remote data source such as a lookup on the network. This lookup can include a query against a cloud database, or a deeper analysis of certain elements on a network based computer. For example, external features can include a determination by a trusted third party as to a data parcel's authenticity, a data parcel's prevalence among a larger population of computers, and/or the reputations of other computers contacted by a data parcel. Frequently, these features entail knowledge that is impractical to host on an individual computer due to size, complexity, or frequency of updates. Due to the latency of a network lookup, these features can generally be collected in response to a particular request from the discernment engine 204, at a particular point-in-time.

Features can be collected into efficient computer data structures, such as hash tables, binary trees, and vectors, and the features can be passed to the discernment engine 204. Ongoing features can be collected and held for an appropriate amount of time to ensure their ability to usefully affect the discernment process. Point in time features can be collected in an on-demand manner, typically on the event of discernment.

Features can be binary, continuous, or categorical in nature. Binary features can only be in one of two states. Continuous features can represent a value along a range, and are generally numeric in nature. Categorical features can represent a value within a discrete set of possible values.

Features can be considered first order or second order or nth order. First order features are features measured directly from the source. These features can be combined or further analyzed by various methods to generate second order features. Such further analyzing can include making a mathematical analysis of the value of a first order feature, or by applying combinations of first order features to develop a truly unique second order feature.

The discernment engine 204 can create a decision on the anticipated safety of an application. The discernment engine 204 can receive input from the feature collector 202 and apply an ensemble of machine learning models to calculate a score that determines if data is safe to run or not, as well as a confidence in the accuracy of the score.

The discernment engine 204 can take features in combination or singly and can, in some cases, use a process known as vectorization to turn individual features into a mathematical vector. This process can involve creating a compact and efficient representation of the input. The vector can be used by the various machine-learning algorithms to generate a score.

The use of ensembles allows multiple, distinct models to be tailored to suit more specialized combinations of features within the more common types of programs. Each sample can be approached with a model that is more appropriate for its type. In addition to model specificity, the general ensemble can offer multiple different learning algorithms per model. This allows sample discernment to benefit from multiple different assessments. Some specific models have lower error rates for particular algorithms, and combining them in a weighted manner helps achieve the highest results.

Ensemble models and/or their outputs can be combined using individualized measured error rates in a weighting scheme (such as a scorecard model). Each model that scores can be normalized and adjusted by its measured error rate. This final combination allows for the most accurate understanding from a variety of sources.

The enforcement system 208 can be a component that implements methods for disabling execution of a program. The enforcement system 208 can use a variety of tactics to disable execution in a safe and reliable way.

Decisions regarding data, such as an application file, may not always be determined before execution of the application file, and so there may be some more complex scenarios that require additional handling. The enforcement system 208 can be integrated deeply with the computer operating system and act on behalf of the discernment engine 208.

The enforcement system 208 can implement one or more of blocking a process or dynamic library from loading into memory, unloading a previously loaded module, disabling a running program, implementing constraints on a program to be run, quarantining hostile applications or data, and/or deleting hostile applications or data. It is often desirable for the enforcement system 208 to issue an alert when a module determined to be hostile is accessed and/or when action is attempted against a hostile module.

The enforcement system 208 can utilize processes implemented both in the operating system core, and implanted in each process. These processes can allow for high degrees of control from both the core operating system level, as well as deep introspection and control from within the application itself.

Additionally, the enforcement system 208 can utilize tactics for preventing an application from running or restricting its level of access. Such tactics can include moving, renaming, or deleting the program; applying attributes or access controls to the program; forcing the application to run with reduced privileges; forcing the application to run in a "sandbox," where certain actions are redirected to access a virtualized system state; and/or other monitoring and controlling the actions an application may perform.

The systems/technique herein can go into effect when an attempt is made to run a program, or a decision is otherwise warranted by user defined behavior, such as intentionally scanning a file to ascertain its safety.

With reference again to diagram 200 of FIG. 2, the features originating from the operating system and the dynamic feature collection system 202 can continue to stream into the discernment engine 204 in an ongoing manner. These can be generally available for use within the discernment engine 204, and may initiate a discernment action if one is warranted.

Generally, however, the system/methods can be activated during the actions of the system or the user when they choose to either start an application or otherwise choose to determine a file's safety. When one of these events is triggered, the discernment engine 204 can request additional details from the feature collector. The feature collector 202 can then gather the appropriate details and pass them to the discernment engine 204. These features may originate via static, dynamic, operational, or external features.

The discernment engine 204 can take all collected features, and use a vectorization process to develop a vector as input (see diagram 300 of FIG. 3). The input vector 302 can be associated with one or more models by the model selector 304 of the discernment engine 204. For each model the model selector 304 chooses, the input vector 302 can be applied. Each model can have one or more algorithms associated with it, generating a series of individual scores. The outputs of the individual models can be combined in a scoring component 304, utilizing a weighting scheme (e.g., a scorecard model). The scoring component 304 can generate a final score, comprised of a result (e.g., safe or not) and a confidence in that result.

The enterprise system components can include one or more processors. The processor(s) is configured to provide information processing capabilities to a computing device having one or more features consistent with the current subject matter. The computing device can be, for example, enterprise server 102, electronic storage device 104, user terminal 108, or the like. The processor(s) may include one or more of a digital processor, an analog processor, a digital circuit designed to process information, an analog circuit designed to process information, a state machine, and/or other mechanisms for electronically processing information. In some implementations, the processor(s) may include a plurality of processing units. These processing units may be physically located within the same device, or the processor(s) may represent processing functionality of a plurality of devices operating in coordination. The processor(s) may be configured to execute machine-readable instructions, which, when executed by the processor(s) may cause the processor(s) to perform one or more of the functions described in the present description. The functions described herein may be executed by software; hardware; firmware; some combination of software, hardware, and/or firmware; and/or other mechanisms for configuring processing capabilities on the processor(s).

The electronic storage device 104 may comprise electronic storage media that electronically stores information. The electronic storage media of electronic storage 104 may include one or both of system storage that is provided integrally (i.e., substantially non-removable) with a computing device, such as the enterprise server 102, and/or removable storage that is removably connectable to the enterprise server 102 via, for example, a port (e.g., a USB port, a firewire port, etc.) or a drive (e.g., a disk drive, etc.). Electronic storage 104 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 104 may include one or more virtual storage resources (e.g., cloud storage, a virtual private network, and/or other virtual storage resources). Electronic storage 104 may store software algorithms, information determined by the processor(s), information received from one or more computing devices, such as enterprise server 102, user terminal 108, information that enables the one or more computing device to function, or the like.

Figure 4:
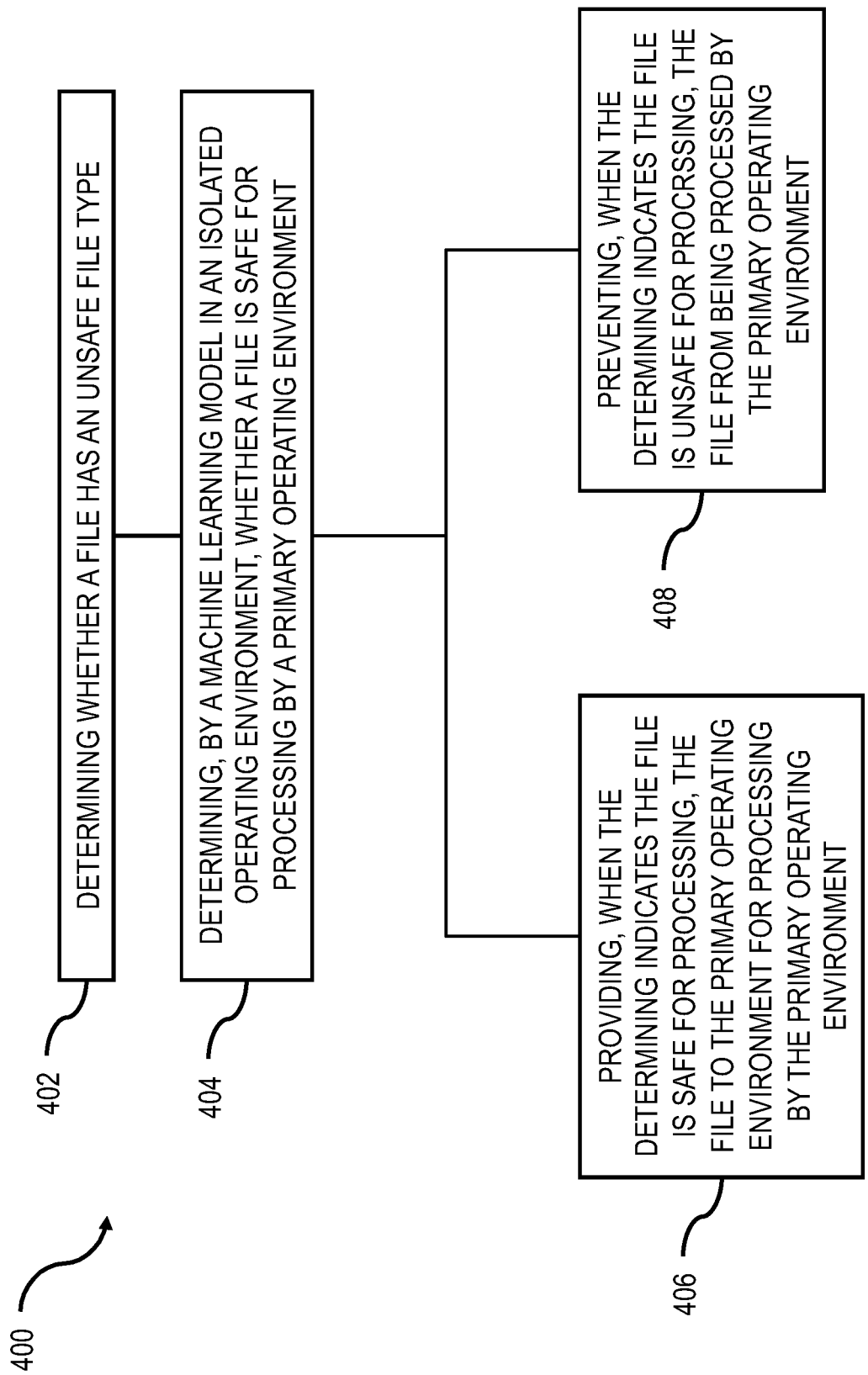
FIG. 4 is a process flow diagram for analyzing data having one or more features consistent with the present description.

FIG. 4 illustrates a method 400 having one or more features consistent with then current subject matter. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At 402, a determination can be made as to whether a file has an unsafe file type. The determination can be made by a primary operating system 109, an isolated operating system, such as local isolated operating system 110 or remote isolated operating system 114, a user terminal 108, or the like. The determination can be based on a comparison of the file with a database of known safe file types, such as database 112. Alternatively, the database can include information on unsafe file types. As used herein a file type may be an extension, data included in the file, a behavior of the file when interacted with by one or more software or hardware components, or the like.

At 404, a machine learning model in an isolated operating environment can determine whether the file is safe for processing by a primary operating environment. The machine learning model can be executed on an isolated operating environment. The isolated operating environment can be configured to interact with and execute the file with potential malicious code without the malicious code being able to infect the primary operating environment.

At 406, when it is determined, by the machine learning model in the isolated operating environment, that the file is safe for processing, the file can be provided to the primary operating environment for processing by the primary operating environment. In some variations, an indication of the location and/or identity of the file can be provided to the primary operating environment.

At 408, when it is determined, by the machine learning model in the isolated operating environment, that the file is unsafe for processing, the file can be prohibited from being processed by the primary operating environment.

Figure 5:
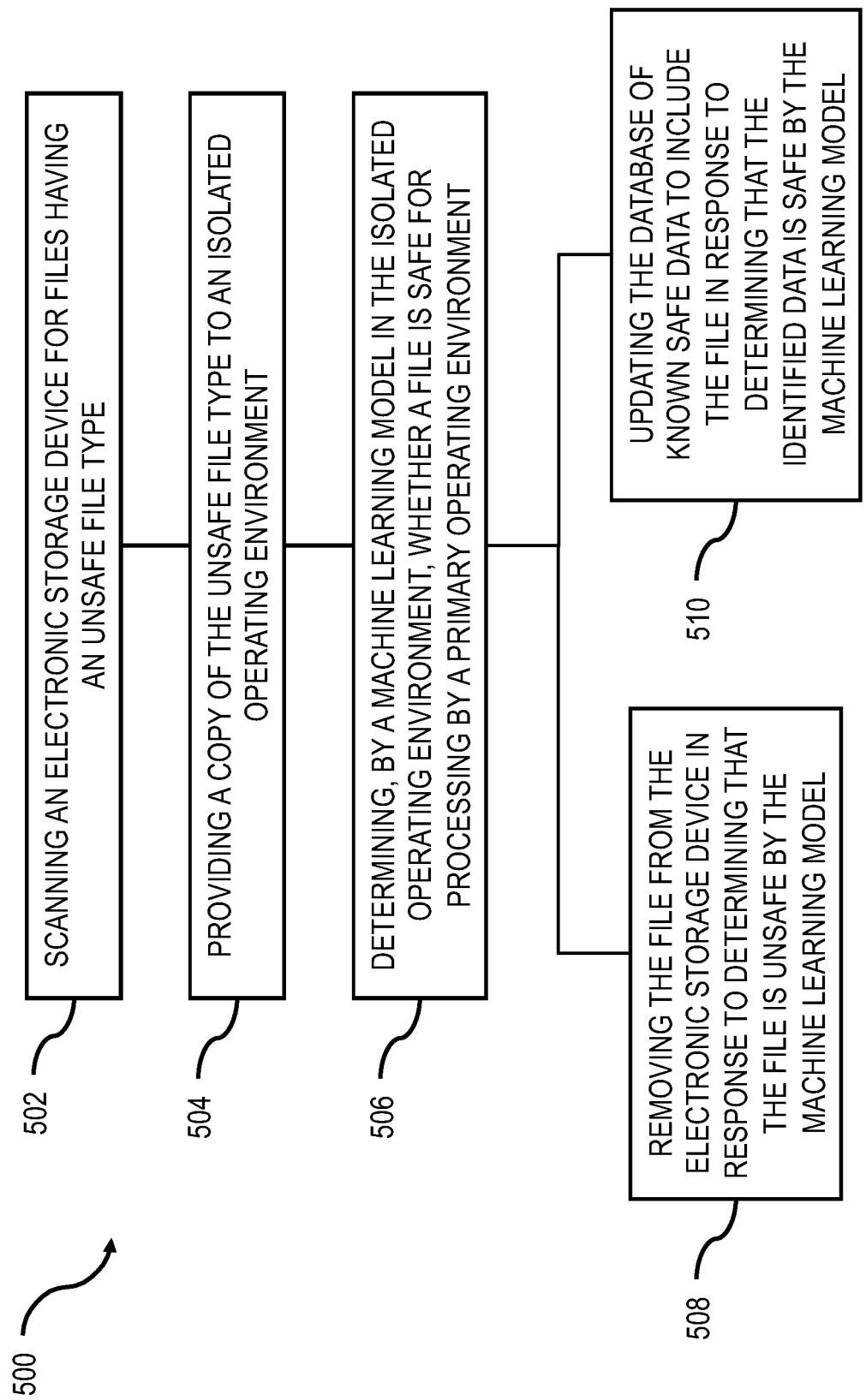
FIG. 5 is a process flow diagram for analyzing data on a storage device having one or more features consistent with the present description; and, FIG. 6 illustrates a method having one or more features consistent with then current subject matter.

FIG. 5 illustrates a method 500 having one or more features consistent with then current subject matter. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

In some variations, the operations of method 400 can be augmented by operations 500.

At 502, an electronic storage device, for example electronic storage device 104, can be scanned for files having an unsafe file type. The scanning can be performed using an isolated operating environment, such as local isolated operating environment 110, remote isolated operating environment 114, or the like. The scanning can be performed to identify data stored on the electronic storage device that do not match with a database of known safe data.

At 504, a copy of the file having an unsafe file type can be provided to the isolated operating environment. At 506, the file can be analyzed to determine whether the file is safe for processing by the primary operating environment. The analysis can be performed using a machine learning model. At 508, the file can be removed from the electronic storage device in response to determining, by the machine learning model, that the file is unsafe for processing by the primary operating environment. At 510, the database of known safe file types can be updated to include the file in response to determining, by the machine learning model, that the file is safe for processing by the primary operating environment.

Figure 6:
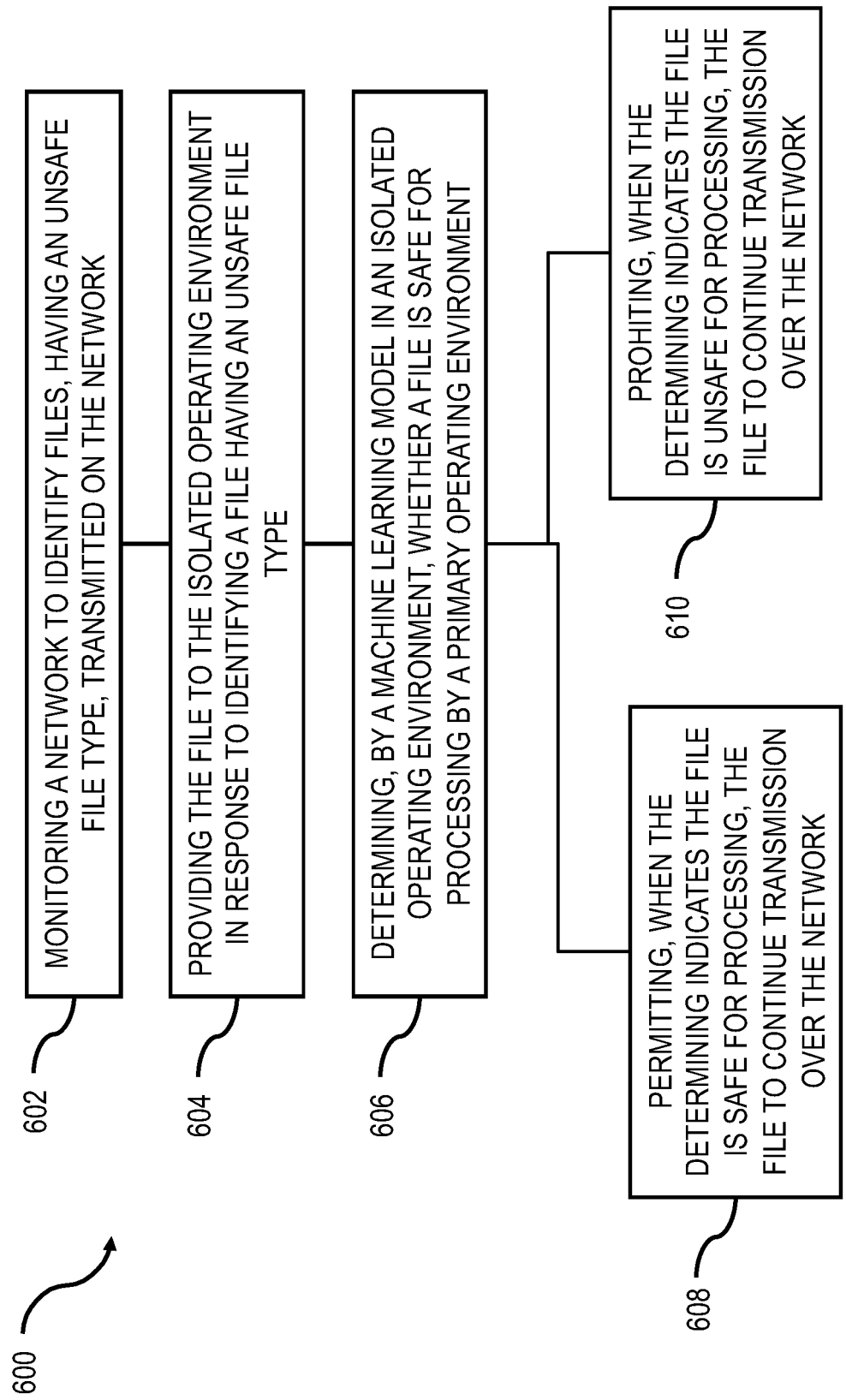

FIG. 6 illustrates a method 600 having one or more features consistent with then current subject matter. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

In some variations, the operations of method 400 can be augmented by operations 600.

At 602, a network can be monitored to identify files, having an unsafe file type, transmitted on the network. At 604, the file can be provided to an isolated operating environment, in response to identifying a file having an unsafe file type. At 606, a machine learning model, in an isolated operating environment, can be used to determine whether the file is safe for processing by the primary operating environment. At 608, when the machine learning model determines that the file is safe for processing, the file can be permitted to continue being transmitted over the network. At 610, when the machine learning model determines that the file is unsafe for processing, the file can be prohibited from being transmitted over the network.

Without in any way limiting the scope, interpretation, or application of the claims appearing herein, a technical effect of one or more of the example embodiments disclosed herein may include increasing the efficiency at which data can be screened. Without in any way limiting the scope, interpretation, or application of the claims appearing herein, a technical effect of one or more of the example embodiments disclosed herein may include providing effective isolation and analysis of data on a cloud-based data analysis device.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" one or more of may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

As used herein, when reference is made to a file, it may also comprise at least a portion of the file. For example, when a file is executed, this may also include executing at least a portion of the file.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A computer-implemented method comprising:
receiving or accessing a file;
comparing the file against a database of files that are known to be safe to determine that the file is not present within the database;
locking the file from further interaction and transmitting a copy of the file to a discernment engine having an isolated operating environment in response to the determination that the file is not present within the database;
receiving, by the discernment engine, a request to interact with the copy of the file;
extracting, by the discernment engine, features from the copy of the file, the extracted features comprise dynamic features that relate to execution of the copy of the file;
determining, by a machine learning model executing in the isolated operating environment of the discernment engine using the extracted features, whether the copy of the file is safe for processing by a primary operating environment;
providing, when the determining by the machine learning model executing in the isolated operating environment indicates the copy of the file is safe for processing, parameters associated with the file to the primary operating environment, parameters comprising an identity and location of the file on the enterprise system; and
preventing, when the determining by the machine learning model executing in the isolated operating environment indicates the copy of the file is unsafe for processing, the file from being processed by the primary operating environment, the preventing comprising removing the file from a corresponding storage system;

wherein the primary operating environment retrieves the file using the provided parameters without the file being transmitted from the isolated operating environment to the primary operating environment.

2. The method of claim 1, wherein the determining by the machine learning model is performed in response to an indication that the copy of the file has an unsafe file type.

3. The method of claim 1, wherein the isolated operating environment and the primary operating environment are hosted by the same machine.

4. The method of claim 1, wherein the isolated operating environment is hosted by an isolated machine remote from a primary machine which is hosting the primary operating environment.

5. The method of claim 4, wherein the isolated machine is connected to the primary machine through a cloud-based network.

6. The method of claim 1, wherein the determining is performed during loading of an application in the primary operating environment.

7. The method of claim 6, wherein the application is loaded in the primary operating environment in response to a user request to open the file.

8. The method of claim 1, wherein the file is an executable-type file.

9. The method of claim 1, wherein the file is a file-type which when interacted with causes the at least one processor to initialize a program to execute the file.

10. The method of claim 9, wherein the file-type of the file is PE, OLE, MachO, PDF, ELF, JAVA, DOCX or a script.

11. The method of claim 1, further comprising:
monitoring a network to identify files having an unsafe file type transmitted on the network; and
providing the file to the isolated operating environment in response to identifying a file having an unsafe file type.

12. The method of claim 1, wherein the determining is performed in response to a user request to interact with the file.

13. The method of claim 1, wherein the file includes an email and the determining is performed in response to receipt of an email over a network.

14. The method of claim 1, wherein features utilized by the machine learning model are selected from each of four different sources comprising:
a first source comprising operational features that characterize one or more of details about an operating system used in the isolated operating environment, a run status of a program utilizing the file, or configuration variables associated with the program utilizing the file;
a second source comprising static features characterizing the file;
a third source comprising dynamic features characterizing execution of the program utilizing the file; and
a fourth source comprising external features extracted from sources of information outside of the isolated operating environment.

15. A system comprising:
a processor; and,
a memory storing machine-readable instructions, which when executed by the processor, cause the processor to perform one or more operations, the operations comprising:
receiving or accessing a file by an enterprise server;
comparing, by the enterprise server, the file against a database of files that are known to be safe to determine that the file is not present within the database;
locking the file on the enterprise server from further interaction;
providing, by the enterprise server, the file to a discernment engine;
receiving, by the discernment engine having an isolated operating environment, a request to interact with the file in response to the determination that the file is not present within the database;
extracting, by the discernment engine, features from the file, the extracted features comprise dynamic features that relate to execution of the copy of the file;
determining, by a machine learning model executing in the isolated operating environment of the discernment engine using the extracted features, whether the file is safe for processing by a primary operating environment;
providing, when the determining by the machine learning model executing in the isolated operating environment indicates that the file is safe for processing, parameters comprising an identity and location of the file on an enterprise system; and
preventing, when the determining by the machine learning model executing in the isolated operating environment indicates the file is unsafe for processing, the file from being processed by the primary operating environment by removing the file from the enterprise server;
wherein the primary operating environment retrieves the file using the provided parameters without the file being transmitted from the isolated operating environment to the primary operating environment.

16. The system of claim 15, wherein features utilized by the machine learning model are selected from each of four different sources comprising:
a first source comprising operational features that characterize one or more of details about an operating system used in the isolated operating environment, a run status of a program utilizing the file, or configuration variables associated with the program utilizing the file;
a second source comprising static features characterizing the file;
a third source comprising dynamic features characterizing execution of the program utilizing the file; and
a fourth source comprising external features extracted from sources of information outside of the isolated operating environment.

17. A non-transitory computer program product storing machine-readable instructions, which when executed by at least one processor forming part of at least one computing device, cause the at least one processor to perform one or more operations, the operations comprising:
receiving or accessing a file;
comparing the file against a database of files that are known to be safe to determine that the file is not present within the database;
locking the file from further interaction;
receiving, by a discernment engine, a request to interact with the file;
extracting, by the discernment engine, features from the file, the extracted features comprise dynamic features that relate to execution of the file;
determining, by a machine learning model executing in the isolated operating environment of the discernment engine using the extracted features, whether the file is safe for processing by a primary operating environment which is remote from the isolated operating environment;

providing, when the determining by the machine learning model executing in the isolated operating environment indicates the file is safe for processing, parameters comprising an identity and location of the file on an enterprise system to the primary operating environment; and preventing, when the determining by the machine learning model executing in the isolated operating environment indicates the file is unsafe for processing, the file from being processed by the primary operating environment, the preventing comprising removing the file from a corresponding storage system;

wherein the primary operating environment retrieves the file using the provided parameters without the file being transmitted from the isolated operating environment to the primary operating environment.

18. The computer program product of claim 17, wherein features utilized by the machine learning model are selected from each of four different sources comprising:

a first source comprising operational features that characterize one or more of details about an operating system used in the isolated operating environment, a run status of a program utilizing the file, or configuration variables associated with the program utilizing the file;

a second source comprising static features characterizing the file;

a third source comprising dynamic features characterizing execution of the program utilizing the file; and a fourth source comprising external features extracted from sources of information outside of the isolated operating environment.

\* \* \* \* \*

UNITED STATES PATENT AND TRADEMARK OFFICE
CERTIFICATE OF CORRECTION

PATENT NO. : 11,182,471 B2
APPLICATION NO. : 15/886610
DATED : November 23, 2021
INVENTOR(S) : Ryan Permeh et al.

Page 1 of 1

It is certified that error appears in the above-identified patent and that said Letters Patent is hereby corrected as shown below:

On the Title Page

Column 2, item (56) Other Publications, Line 1, delete "Acarnnan." and insert -- Acarman. --.

In the Claims

Column 16, Line 63, in Claim 1, delete "the enterprise system" and insert -- an enterprise system --.

Column 17, Line 62, Claim 15, delete "and," and insert -- and --.

Signed and Sealed this
Tenth Day of February, 2026

John A. Squires
*Director of the United States Patent and Trademark Office*